United States Patent
Akama

(10) Patent No.: US 9,369,826 B2
(45) Date of Patent: Jun. 14, 2016

(54) MOBILE ELECTRONIC DEVICE COORDINATION SYSTEM, INFORMATION PROVIDING APPARATUS, MOBILE ELECTRONIC DEVICE, AND PROGRAM FOR MOBILE ELECTRONIC DEVICE

(71) Applicant: HONDA MOTOR CO., LTD., Tokyo (JP)

(72) Inventor: Shinichi Akama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 15 days.

(21) Appl. No.: 14/310,893

(22) Filed: Jun. 20, 2014

(65) Prior Publication Data

US 2014/0378060 A1 Dec. 25, 2014

(30) Foreign Application Priority Data

Jun. 25, 2013 (JP) ................................. 2013-132491

(51) Int. Cl.
  *H04B 7/00* (2006.01)
  *H04W 4/00* (2009.01)
  *H04B 1/68* (2006.01)

(52) U.S. Cl.
  CPC ..................... *H04W 4/008* (2013.01)

(58) Field of Classification Search
  CPC ..... H04W 4/008; H04W 12/06; H04W 12/08; H04W 84/18; H04L 63/0853; H04M 1/7253
  USPC ................. 455/41.1–41.3, 410–411
  See application file for complete search history.

(56) References Cited

U.S. PATENT DOCUMENTS

| | | | |
|---|---|---|---|
| 2010/0211685 A1* | 8/2010 | McDowall | H04L 63/061 709/227 |
| 2010/0216401 A1* | 8/2010 | Kitahara | H04M 1/6091 455/41.2 |
| 2011/0210831 A1* | 9/2011 | Talty | H04B 5/0031 340/10.51 |
| 2014/0248863 A1* | 9/2014 | Golsch | H04W 4/046 455/418 |

FOREIGN PATENT DOCUMENTS

| | | |
|---|---|---|
| JP | 2004-140731 A | 5/2004 |
| JP | 2009-60526 A | 3/2009 |

OTHER PUBLICATIONS

Office Action dated Dec. 4, 2015, issued in counterpart Chinese Patent Application No. 201410256279.X.

* cited by examiner

*Primary Examiner* — Lee Nguyen
(74) *Attorney, Agent, or Firm* — Westerman, Hattori, Daniels & Adrian, LLP

(57) ABSTRACT

A mobile electronic device coordination system includes a vehicle-mounted information providing apparatus and a mobile electronic device. The information providing apparatus and the mobile electronic device are each configured to perform both first type communication and second type communication different from the first type communication. The information providing apparatus acquires unique information from the mobile electronic device via the first type communication through which a communication connection with the mobile electronic device has been established, the unique information being necessary for individual identification of the mobile electronic device for establishing a communication connection with the mobile electronic device via the second type communication. Then, the information providing apparatus establishes a communication connection with the mobile electronic device via the second type communication on the basis of the acquired specific information.

10 Claims, 9 Drawing Sheets

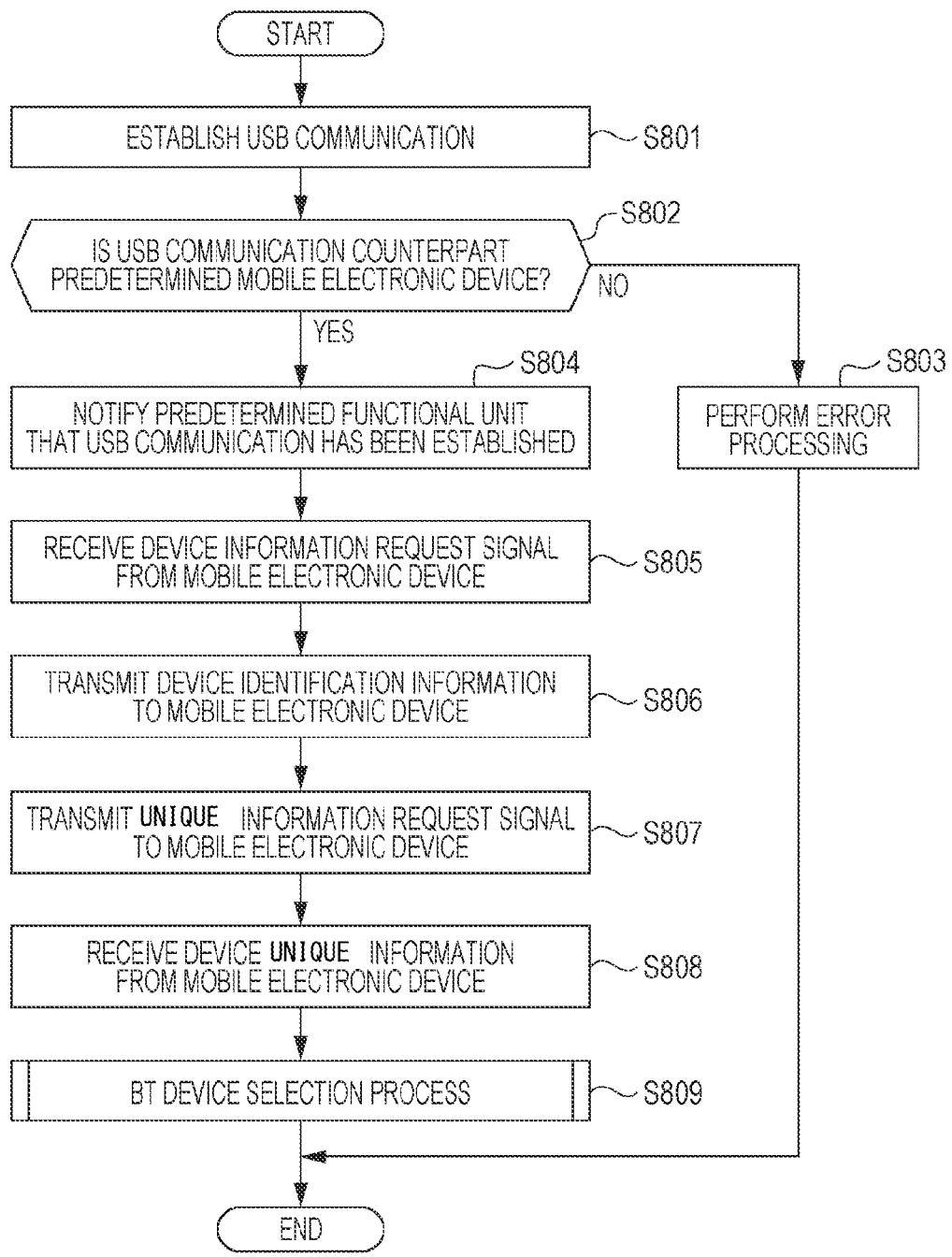

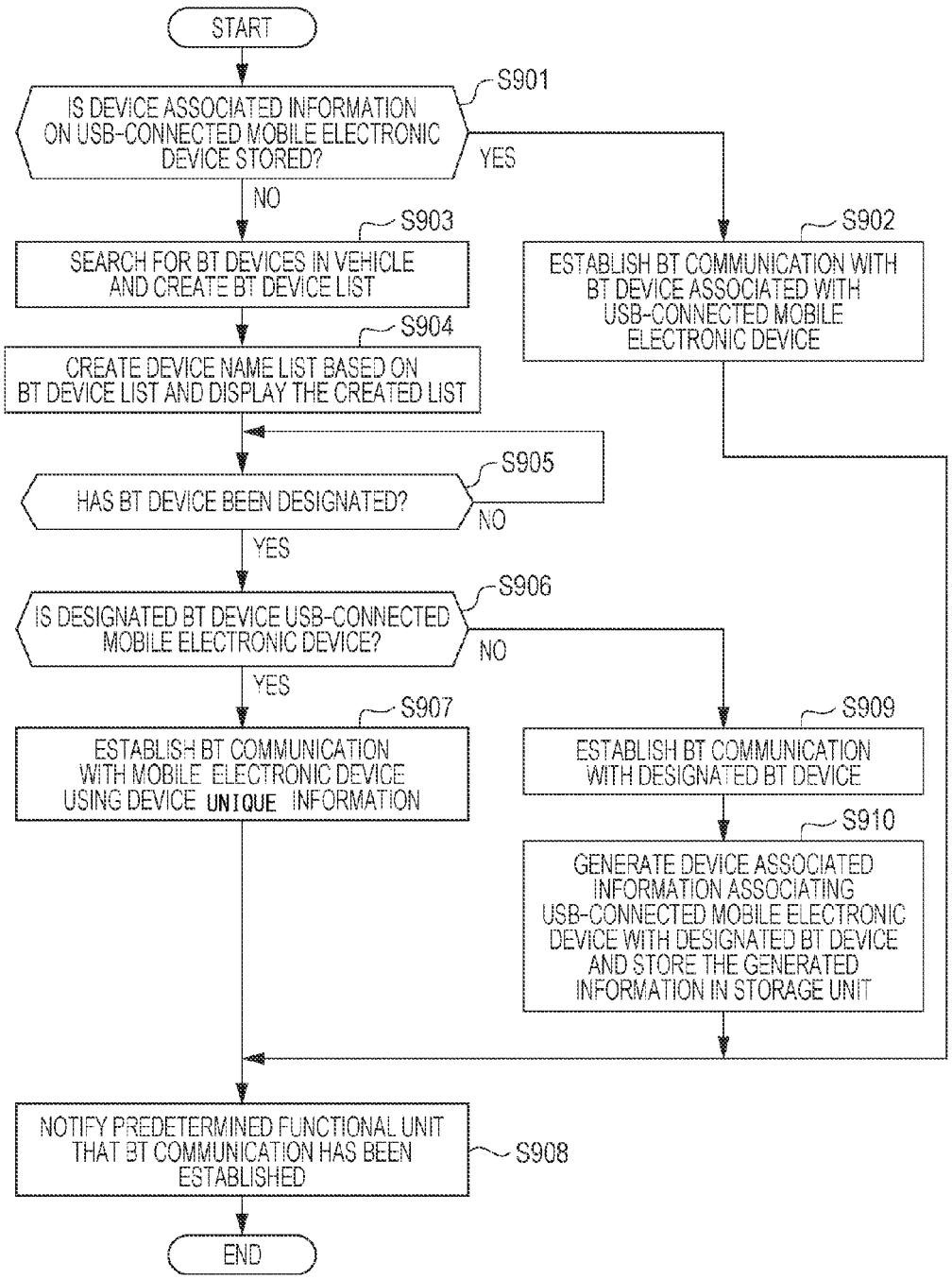

MOBILE ELECTRONIC DEVICE COORDINATION SYSTEM, INFORMATION PROVIDING APPARATUS, MOBILE ELECTRONIC DEVICE, AND PROGRAM FOR MOBILE ELECTRONIC DEVICE

CROSS REFERENCES TO RELATED APPLICATIONS

The present application claims priority under 35 U.S.C. §119 to Japanese Patent Application No. 2013-132491, filed Jun. 25, 2013, entitled "Mobile Electronic Device Coordination System, Information Providing Apparatus, Mobile Electronic Device, and Program for Mobile Electronic Device." The contents of this application are incorporated herein by reference in their entirety.

TECHNICAL FIELD

The present disclosure relates to a mobile electronic device coordination system for enabling use of functions of a mobile electronic device, such as a smartphone, via a vehicle-mounted apparatus. In particular, the present disclosure relates to a mobile electronic device coordination system capable of easing a driver's operation for communication connection between a mobile electronic device and a vehicle-mounted apparatus, an information providing apparatus and a mobile electronic device included in the mobile electronic device coordination system, and a program to be executed by the mobile electronic device.

BACKGROUND

With increasing use of mobile phones, hands-free apparatuses for enabling hands-free use of (i.e., hands-free calls on) a driver's mobile phone via a vehicle-mounted microphone and speaker have become widespread.

Such a hands-free apparatus is configured, for example, as part of a vehicle-mounted navigation system equipped with a microphone and a speaker. The hands-free apparatus communicates with a mobile phone via near field communication which is compliant with a communication standard called Bluetooth® (registered trademark), outputs from the speaker a received voice input from the mobile phone, and outputs a driver's voice detected by the microphone to the mobile phone (see, e.g., Japanese Unexamined Patent Application Publication No. 2004-140731).

A device that performs communication compliant with Bluetooth® will hereinafter be referred to as a Bluetooth® device or BT device. In general, a Bluetooth® device serves as a master and searches for other Bluetooth® devices (slaves) around the master. For example, via an input unit of the master, a user typically selects a slave with which the user wants to connect to the master, from the slaves found by the search. The selected slave is registered in the master, and a personal identification number (PIN) code is shared between the slave and the master. Thus, a communication connection between the registered slave and the master is established, and communication confidentiality is ensured.

In the related art described above, first, the hands-free apparatus serving as a master searches for mobile phones which are slaves. Next, a driver who is a user selects his or her mobile phone from the mobile phones found by the search, and registers the selected mobile phone in the hands-free apparatus. This enables hands-free calls on the driver's mobile phone. Once the mobile phone is registered as described above, the hands-free apparatus can quickly start to communicate with the registered mobile phone without performing the search operation every time the power is turned on.

The hands-free apparatus typically allows registration of more than one mobile phone. When a plurality of different drivers use the same vehicle, these drivers can register their own mobile phones in the hands-free apparatus and make hands-free calls.

However, when a plurality of mobile phones are registered, the driver (user) needs to identify his or her own mobile phone, for example, from a list of registered mobile phones displayed on a display unit of the hands-free apparatus, and to input an instruction to cause the hands-free apparatus to connect to the identified mobile phone. To eliminate the need for the user to input such an instruction, a known hands-free apparatus of the related art automatically connects to the last registered mobile phone or to the previously connected mobile phone. However, a mobile phone that meets such a condition is not necessarily one the user wants to use.

In recent years, there have been a growing number of people who use a smartphone (multifunctional mobile phone) which has not only a phone function but also an Internet communication function and a function of providing various services by executing application software. A coordination system for using, for example, a navigation function of the smartphone via a vehicle-mounted display is known.

In this coordination system, the smartphone and the vehicle-mounted apparatus are connected such that they can communicate with each other via a communication bus compliant with a communication standard, such as Universal Serial Bus (USB®, registered trademark), or via a short-range wireless local area network (LAN) using a Wireless Fidelity (Wi-Fi®, registered trademark) certified device. This enables transmission of image data from the smartphone, and transmission of a driver's instruction input from a vehicle-mounted input unit to the smartphone for use of various services such as navigation services of the smartphone.

In this case, to use both a service provided by the smartphone via the coordination system and a phone function of the smartphone via the hands-free apparatus, the driver has to perform various setting operations, for example, every time the vehicle-mounted apparatus is powered on. Specifically, the driver has not only to operate the hands-free apparatus to select or designate the smartphone, but also to operate the smartphone to start a service, such as a navigation service.

Therefore, in a mobile electronic device coordination system for enabling use of functions of a mobile electronic device (e.g., multifunctional mobile phone) via a vehicle-mounted apparatus, it is desired to simplify a setting operation a driver needs to perform to establish communication between the mobile electronic device and the vehicle-mounted apparatus.

SUMMARY

The present disclosure provides a mobile electronic device coordination system including a vehicle-mounted information providing apparatus configured to provide information to a vehicle's driver and a mobile electronic device. The mobile electronic device coordination system is configured to enable use of functions of the mobile electronic device via the information providing apparatus. The information providing apparatus and the mobile electronic device are each configured to perform both first type communication and second type communication different from the first type communication. The information providing apparatus is configured to acquire unique information from the mobile electronic device via the first type communication through which a communication connection with the mobile electronic device has been established, the unique information being necessary for individual identification of the mobile electronic device for establishing a communication connection with the mobile electronic device for the second type communication; and establish a communication connection with the mobile electronic device for the second type communication on the basis of the acquired unique information.

According to one aspect of the present disclosure, if the information providing apparatus fails to establish a communication connection with the mobile electronic device for the second type communication on the basis of the acquired unique information, the information providing apparatus may terminate the communication connection for the first type communication.

According to another aspect of the present disclosure, in response to an input of designation of a communication counterpart with which to establish a communication connection for the second type communication, the information providing apparatus may establish a communication connection for the second type communication with the mobile electronic device corresponding to the acquired unique information or with a different device that performs the second type communication.

According to another aspect of the present disclosure, the information providing apparatus may implement a hands-free call function by performing the second type communication with the mobile electronic device.

According to another aspect of the present disclosure, after the information providing apparatus establishes a communication connection with the mobile electronic device for the first type communication and establishes a communication connection with the different device for the second type communication, if the information providing apparatus newly establishes a communication connection with the mobile electronic device for the first type communication, the information providing apparatus may establish a communication connection with the different device for the second type communication.

The present disclosure also provides a vehicle-mounted information providing apparatus that enables use of functions of a mobile electronic device by communicating with the mobile electronic device. The information providing apparatus includes a first communication unit configured to perform first type communication, a second communication unit configured to perform second type communication different from the first type communication, and a processor configured to control communication performed by the first communication unit and the second communication unit such that the first communication unit establishes a communication connection with the mobile electronic device for the first type communication; the first communication unit acquires unique information from the mobile electronic device, the unique information being necessary for individual identification of the mobile electronic device for establishing a communication connection with the mobile electronic device for the second type communication; and the second communication unit establishes a communication connection with the mobile electronic device for the second type communication on the basis of the acquired unique information.

The present disclosure also provides a mobile electronic device that enables use of functions thereof by communicating with a vehicle-mounted information providing apparatus configured to provide information to a vehicle's driver. The mobile electronic device includes a first communication unit configured to perform first type communication, a second communication unit configured to perform second type communication different from the first type communication, and a processor configured to control communication performed by the first communication unit and the second communication unit such that the first communication unit establishes a communication connection with the information providing apparatus for the first type communication; and when the first communication unit receives a predetermined request signal from the information providing apparatus, the first communication unit transmits unique information to the information providing apparatus, the unique information being necessary for individual identification of the mobile electronic device for establishing a communication connection with the information providing apparatus for the second type communication.

The present disclosure also provides a program executed by a computer of a mobile electronic device that includes a first communication unit configured to perform first type communication, a second communication unit configured to perform second type communication different from the first type communication, and the computer which is a processor configured to control communication performed by the first communication unit and the second communication unit. The program causes the computer to execute the steps of establishing a communication connection with an information providing apparatus for the first type communication using the first communication unit; and transmitting unique information from the first communication unit to the information providing apparatus when the first communication unit receives a predetermined request signal from the information providing apparatus, the unique information being necessary for individual identification of the mobile electronic device for establishing a communication connection with the information providing apparatus for the second type communication.

According to the present disclosure, in a mobile electronic device coordination system for enabling use of functions of a mobile electronic device (e.g., multifunctional mobile phone) via a vehicle-mounted apparatus, it is possible to simplify a setting operation a driver needs to perform to establish communication between the mobile electronic device and the vehicle-mounted apparatus.

BRIEF DESCRIPTION OF THE DRAWINGS

The advantages of the disclosure will become apparent in the following description taken in conjunction with the following drawings.

FIG. 8 is a flowchart illustrating a device authentication process in the information providing apparatus included in the coordination system according to the second embodiment.

FIG. 9 is a flowchart illustrating a BT device selection process executed in the device authentication process illustrated in FIG. 8.

DETAILED DESCRIPTION

Embodiments will now be described with reference to the drawings.

First Embodiment

A mobile electronic device coordination system (hereinafter referred to as a coordination system) according to a first embodiment includes a vehicle-mounted information providing apparatus and a mobile electronic device. The information providing apparatus and the mobile electronic device are each configured to perform both first type communication and second type communication which is different from the first type communication. The information providing apparatus acquires unique information from the mobile electronic device via the first type communication through which a communication connection with the mobile electronic device has been established. The unique information is necessary for individual identification of the mobile electronic device for establishing a communication connection with the mobile electronic device for the second type communication. Then, the information providing apparatus establishes a communication connection with the mobile electronic device for the second type communication on the basis of the acquired unique information. Specifically, the coordination system of the first embodiment performs bus communication compliant with the USB® standard (hereinafter referred to as USB® communication) as the first type communication, and performs short-range wireless communication compliant with the Bluetooth® standard (hereinafter referred to as Bluetooth® communication or BT communication) as the second type communication.

Figure 1:
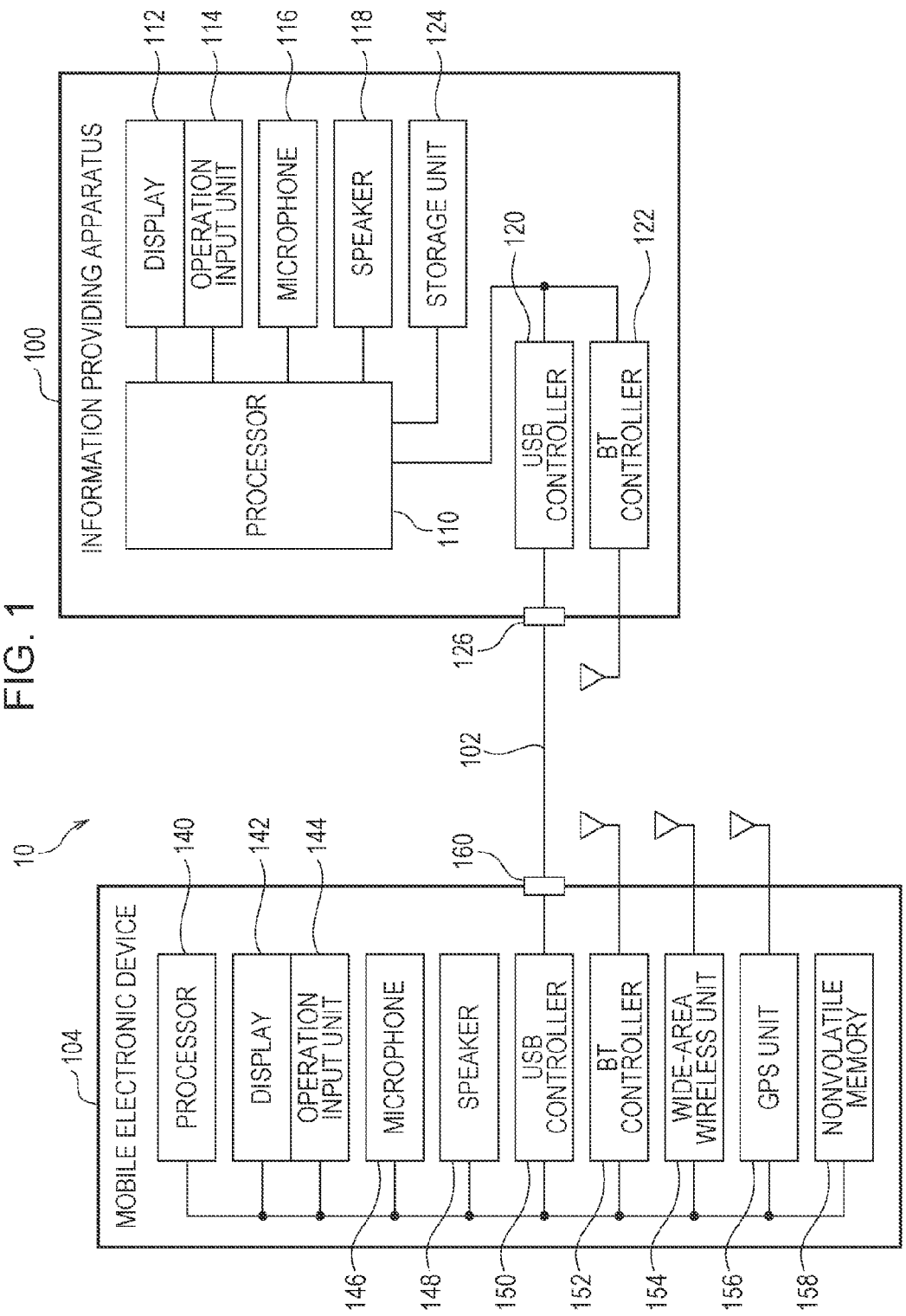
FIG. 1 illustrates a configuration of a mobile electronic device coordination system according to a first embodiment.

FIG. 1 illustrates a configuration of a coordination system according to the first embodiment.

A coordination system 10 includes an information providing apparatus 100 mounted on a vehicle, and a mobile electronic device 104 connected via a communication cable 102 to the information providing apparatus 100 such that it can communicate with the information providing apparatus 100.

The mobile electronic device 104 is, for example, a smartphone (multifunctional mobile phone) owned by each driver who uses the vehicle. Each driver operates the coordination system 10 by connecting the mobile electronic device 104 via the communication cable 102 to the information providing apparatus 100 when getting into the vehicle. When ending the use of the vehicle, the driver can remove the mobile electronic device 104 from the information providing apparatus 100, take the mobile electronic device 104 out of the vehicle, and use the mobile electronic device 104 alone.

Figure 2:
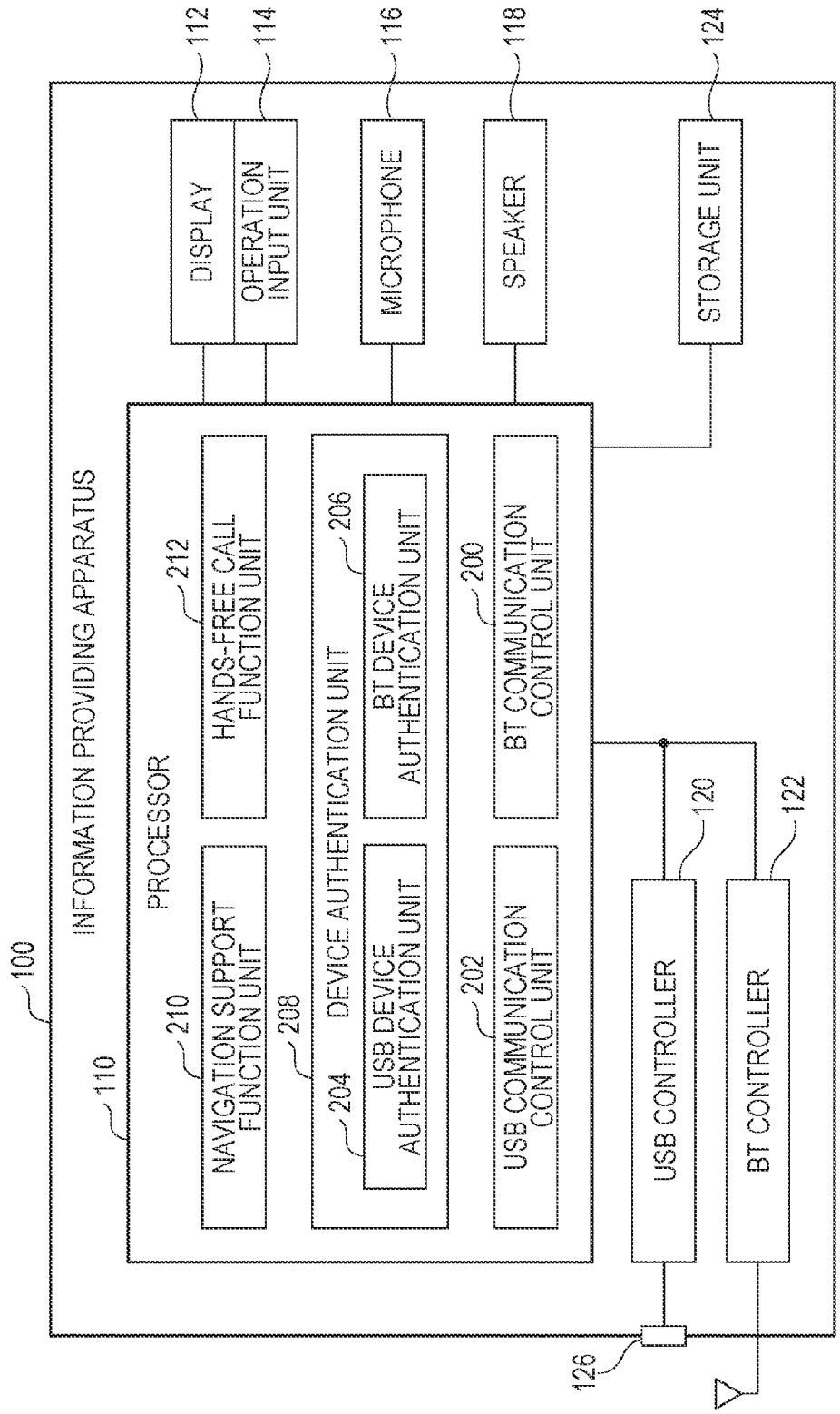
FIG. 2 illustrates a configuration of an information providing apparatus included in the coordination system according to the first embodiment.

A configuration of the information providing apparatus 100 will now be described. FIG. 2 illustrates a configuration of the information providing apparatus 100. In FIG. 2, the same components as those of the information providing apparatus 100 illustrated in FIG. 1 are indicated by the same reference numerals as those in FIG. 1.

The information providing apparatus 100 includes a processor 110, a display 112, an operation input unit 114, a microphone 116, a speaker 118, a USB® controller 120, a BT controller 122, a storage unit 124, and a connector 126.

The display 112 is formed, for example, by a liquid crystal display (LCD) and displays visual information, such as a map.

The operation input unit 114 is used by an occupant of the vehicle to perform an input operation, such as a data input operation, on a display output on the display 112. For example, the operation input unit 114 may be a touch panel on a display screen of the display 112.

The microphone 116 detects an occupant's voice and inputs the detected voice to the processor 110. The speaker 118 converts an electrical signal output from the processor 110 into sound and outputs the sound.

The USB® controller 120 is a communication unit for performing USB® communication which is first type communication. The USB® controller 120 is a first communication unit included in the information providing apparatus 100. In the first embodiment, the USB® controller 120 is connected to the mobile electronic device 104 via the communication cable 102 connected to the connector 126.

The BT controller 122 is a communication unit for performing Bluetooth® communication (BT communication) which is second type communication. The BT controller 122 is a second communication unit included in the information providing apparatus 100. In the first embodiment, the information providing apparatus 100 performs BT communication with the mobile electronic device 104 to implement, for example, a hands-free call function for making a hands-free call using a phone function of the mobile electronic device 104.

The storage unit 124 is formed by a nonvolatile memory, such as a flash memory, and stores information necessary for the operation of the processor 110. Device identification information (e.g., device type information indicating a device type, and a device ID including a model number and a production number) for indicating the identity of the information providing apparatus 100 to other devices is stored in the storage unit 124 in advance.

The processor 110 is a computer that includes a processing unit, such as a central processing unit (CPU), and a storage unit composed of a read-only memory (ROM) having a program written therein and a random-access memory (RAM) for temporary storage of data. The processor 110 includes a BT communication control unit 200, a USB® communication control unit 202, a device authentication unit 208 including a USB® device authentication unit 204 and a BT device authentication unit 206, a navigation support function unit 210, and a hands-free call function unit 212.

Each unit included in the processor 110 is a function implementing unit and is a virtual machine implemented when the processor 110, which is a computer, executes a program. In another embodiment, each unit included in the processor 110 may be configured as a separate hardware component. The computer program can be stored in any computer-readable storage medium.

The USB® communication control unit 202 controls the operation of the USB® controller 120. When a USB® device (i.e., a device capable of performing USB® communication) is connected via the connector 126 to the information providing apparatus 100, the USB® communication control unit 202 establishes USB® communication in accordance with a protocol defined by the USB® communication standard. To establish the USB® communication, the USB® communication control unit 202 acquires a device descriptor from the USB® device, which is a connection counterpart, in accordance with a typical USB® communication protocol, and stores the acquired device descriptor in the storage unit 124. The device descriptor contains device information unique to the USB® device, such as device type information (device class), device vendor information, and product identification information (e.g., device name, model number, and production number). The USB® communication control unit 202 transmits a notification indicating that the USB® communication has been established to the device authentication unit 208.

Upon receipt of the notification indicating that the USB® communication has been established from the USB® communication control unit 202, the USB® device authentication unit 204 in the device authentication unit 208 refers to the device descriptor of the USB® device stored in the storage unit 124 by the USB® communication control unit 202, and determines whether the USB® device is the mobile electronic device 104. This determination can be made by comparing, for example, the type information and the product identification information contained in the device descriptor with the type information and the product identification information stored in advance as information representing the mobile electronic device 104.

If the connected USB® device is the mobile electronic device 104, the USB® device authentication unit 204 transmits, to the navigation support function unit 210, a notification indicating that the USB® communication with the mobile electronic device 104 has been established.

When a device information request signal is received from the mobile electronic device 104 via the USB® communication, the USB® device authentication unit 204 reads the device identification information of the information providing apparatus 100 stored in advance in the storage unit 124, and transmits the read device identification information to the mobile electronic device 104.

The USB® device authentication unit 204 also transmits a unique information request signal to the mobile electronic device 104 via the USB® communication. The unique information request signal is a predetermined request signal that requests transmission of the unique information (device unique information) from the mobile electronic device 104. In response to this, the mobile electronic device 104 transmits the device unique information which is unique information necessary for individual identification of the mobile electronic device 104 to the information providing apparatus 100 via the USB® communication. The device unique information is necessary for the information providing apparatus 100 to establish a communication connection with the mobile electronic device 104 for BT communication.

The device unique information contains a Bluetooth® device address (hereinafter referred to as a BT device address), a PIN code, and a Bluetooth® profile (hereinafter referred to as a BT profile) of the mobile electronic device 104 which is a Bluetooth® device. The BT device address is information for individual identification of the mobile electronic device 104, and is used for pairing (forming a communication channel) between BT devices (i.e., between the information providing apparatus 100 and the mobile electronic device 104). The PIN code is used to establish BT communication which enables encrypted communication between the BT devices which have been paired. The BT profile is information that defines, for each type of BT device (i.e., the functional type of device, such as a mobile phone, a printer, or an audio player), a protocol applied to the BT device. The BT profile is used to identify the functional type of the BT device.

The USB® device authentication unit 204 receives the transmitted device unique information, acquires the BT device address and the PIN code from the received device unique information, stores the acquired BT device address and PIN code in the storage unit 124, and at the same time transmits the acquired BT device address and PIN code to the BT device authentication unit 206.

Upon receipt of the BT device address and the PIN code of the mobile electronic device 104 from the USB® device authentication unit 204, the BT device authentication unit 206 first transmits the received BT device address to the BT communication control unit 200 to instruct the BT communication control unit 200 to establish pairing (i.e., to form a communication channel) between the information providing apparatus 100 and the mobile electronic device 104.

When a notification indicating that the pairing has been completed is received from the BT communication control unit 200, the BT device authentication unit 206 transmits the received PIN code to the BT communication control unit 200 to instruct the BT communication control unit 200 to establish BT communication (i.e., to establish a state which enables encrypted communication) between the information providing apparatus 100 and the mobile electronic device 104.

When a notification indicating that the BT communication has been successfully established is received from the BT communication control unit 200, the BT device authentication unit 206 stores the input BT device address and PIN code in the storage unit 124. At the same time, the BT device authentication unit 206 notifies the hands-free call function unit 212 that the BT communication has been established.

The BT communication control unit 200 controls the operation of the BT controller 122. In accordance with instructions from the BT device authentication unit 206, the BT communication control unit 200 establishes pairing and BT communication using the BT device address and the PIN code transmitted from the BT device authentication unit 206.

If the pairing has succeeded, the BT communication control unit 200 transmits a notification of completion of the pairing to the BT device authentication unit 206. If the pairing has failed, the BT communication control unit 200 transmits a notification indicating that the pairing has failed to the BT device authentication unit 206. If the BT communication has been successfully established, the BT communication control unit 200 transmits a notification indicating that the BT communication has been successfully established to the BT device authentication unit 206 and maintains the established BT communication. On the other hand, if the BT communication has not been successfully established, the BT communication control unit 200 transmits a notification indicating that the BT communication has not been successfully established to the BT device authentication unit 206.

If no instruction is received from the BT device authentication unit 206, the BT communication control unit 200 searches for other BT devices in accordance with the BT communication standard, and acquires BT device addresses from BT devices found by the search to perform pairing. The BT communication control unit 200 displays the BT devices with which the information providing apparatus 100 has been paired, for example, on the display 112. Then, in accordance with an instruction from the driver via the operation input unit 114, the BT communication control unit 200 establishes BT communication with a BT device designated by the instruction.

When BT communication with the mobile electronic device 104 or another BT device is established, the BT communication control unit 200 generates BT device registration information that associates a BT device address with a PIN code of the BT device with which the BT communication has been established. The BT communication control unit 200 registers the BT device in the information providing apparatus 100 by storing the generated BT device registration information in the storage unit 124.

When a notification indicating that USB® communication with the mobile electronic device 104 has been established is received from the USB® device authentication unit 204, the navigation support function unit 210 starts USB® communication with the mobile electronic device 104, receives an instruction from a navigation function unit 308 of the mobile electronic device 104, displays map information or the like on the display 112, and causes the speaker 118 to output audio guidance or the like associated with routing guidance. Also, the navigation support function unit 210 transmits an instruction input by the driver to the operation input unit 114 in response to the information displayed on the display 112 and a driver's spoken instruction detected by the microphone 116, via the USB® communication, to the mobile electronic device 104.

Thus, the coordination system 10 can provide the navigation service provided by the navigation function unit 308 of the mobile electronic device 104 to the driver via human interface devices of the vehicle-mounted information providing apparatus 100, such as the display 112, the operation input unit 114, the microphone 116, and the speaker 118.

When a notification indicating that BT communication has been established is received from the BT device authentication unit 206, the hands-free call function unit 212 starts the BT communication with the mobile electronic device 104 and starts processing for making a hands-free call using the mobile electronic device 104.

That is, when an incoming notification is received from the mobile electronic device 104, the hands-free call function unit 212 displays an incoming message on the display 112 and outputs a ring tone from the speaker 118. When the driver inputs a response instruction, for example, via the operation input unit 114, the hands-free call function unit 212 transmits the input to the mobile electronic device 104. This starts a call operation in the mobile electronic device 104.

In a hands-free call, a received voice from the mobile electronic device 104 is output via the hands-free call function unit 212 to the speaker 118, and a driver's voice is detected by the microphone 116 and output via the hands-free call function unit 212 to the mobile electronic device 104.

After the call, the driver can input a call end instruction, for example, to the operation input unit 114. The input is transmitted via the hands-free call function unit 212 to the mobile electronic device 104. Thus, the call operation in the mobile electronic device 104 ends.

When the driver wants to make a phone call, the driver inputs a phone call instruction, for example, via the operation input unit 114. In response to this, the hands-free call function unit 212 displays dial buttons on the display 112, so that the driver can input a desired phone number to the operation input unit 114 by touching the dial buttons. When the hands-free call function unit 212 transmits the phone call instruction and the input phone number to the mobile electronic device 104, the mobile electronic device 104 starts a phone call operation.

Figure 3:
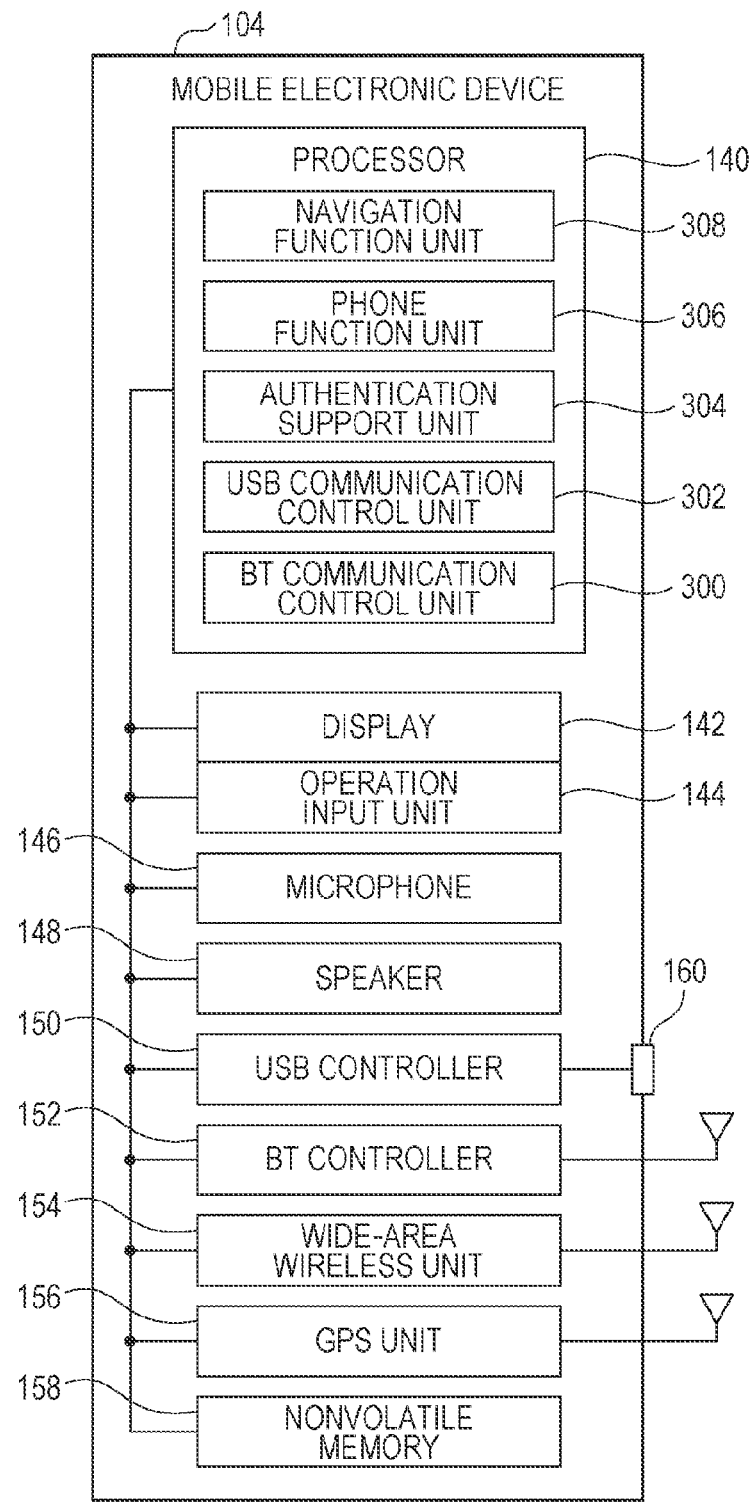
FIG. 3 illustrates a configuration of a mobile electronic device included in the coordination system according to the first embodiment.

Next, a configuration of the mobile electronic device 104 will be described. FIG. 3 illustrates a configuration of the mobile electronic device 104. In FIG. 3, the same components as those of the mobile electronic device 104 illustrated in FIG. 1 are indicated by the same reference numerals as those in FIG. 1.

The mobile electronic device 104 includes a processor 140, a display 142, an operation input unit 144, a microphone 146, a speaker 148, a USB® controller 150, a BT controller 152, a wide-area wireless unit 154, a global positioning system (GPS) unit 156, a nonvolatile memory 158, and a connector 160.

The display 142 is formed, for example, by an LCD and displays visual information, such as a map.

The operation input unit 144 is used by a user to perform an input operation, such as a data input operation, on a display output on the display 142. For example, the operation input unit 144 may be a touch panel on a display screen of the display 142.

For example, when the mobile electronic device 104 independently functions as a phone, the microphone 146 detects a user's voice and the speaker 148 outputs a received voice.

The USB® controller 150 is a communication unit for performing USB® communication which is first type communication. The USB® controller 150 is a first communication unit included in the mobile electronic device 104. In the first embodiment, the USB® controller 150 is connected to the information providing apparatus 100 via the communication cable 102 connected to the connector 160.

The BT controller 152 is a communication unit for performing Bluetooth® communication (BT communication) which is second type communication. The BT controller 152 is a second communication unit included in the mobile electronic device 104.

The wide-area wireless unit 154 is a wireless unit for communicating with a public telephone line or the Internet via a wide-area wireless network.

The GPS unit 156 outputs positioning information for identifying a current location of the mobile electronic device 104. For example, the GPS unit 156 receives GPS signals from a plurality of GPS satellites and outputs data related to the latitude and longitude of the current location.

The nonvolatile memory 158 is formed, for example, by a ROM or a flash memory. The nonvolatile memory 158 stores unique information (device unique information) necessary for individual identification of the mobile electronic device 104 in establishing USB® communication and BT communication. The device unique information for USB® communication contains, for example, the device descriptor described above. The device unique information for BT communication contains, for example, the BT device address, PIN code, and BT profile described above.

The processor 140 is a computer that includes a processing unit such as a CPU, and a storage unit composed of a ROM having a program written therein and a RAM for temporary storage of data. The processor 140 includes a BT communication control unit 300, a USB® communication control unit 302, an authentication support unit 304, a phone function unit 306, and the navigation function unit 308 described above.

Each unit included in the processor 140 is a function implementing unit and is a virtual machine implemented when the processor 140, which is a computer, executes a program. In another embodiment, each unit included in the processor 140 may be configured as a separate hardware component. The computer program can be stored in any computer-readable storage medium.

The USB® communication control unit 302 controls the operation of the USB® controller 150. When the mobile electronic device 104 is connected via the connector 160 to the information providing apparatus 100, the USB® communication control unit 302 establishes USB® communication in accordance with a protocol defined by the USB® communication standard. To establish the USB® communication, the USB® communication control unit 302 reads, from the nonvolatile memory 158, a device descriptor containing device information unique to the mobile electronic device 104, and transmits the read device descriptor, in accordance with a typical USB® communication protocol, to the information providing apparatus 100 which is a communication counterpart.

Upon completion of establishment of the USB® communication, the USB® communication control unit 302 transmits a notification indicating that the USB® communication has been established to the authentication support unit 304.

Upon receipt of the notification indicating that the USB® communication has been established, the authentication support unit 304 transmits, via the USB® communication, a device information request signal that requests the transmission of device identification information from the information providing apparatus 100 which is a communication counterpart. The authentication support unit 304 receives the device identification information transmitted from the information providing apparatus 100. Thus, the authentication support unit 304 recognizes that the communication counterpart is the information providing apparatus 100, and transmits a notification indicating that the USB® communication with the information providing apparatus 100 has been established to the navigation function unit 308.

When a unique information request signal, which is a predetermined request signal, is received from the information providing apparatus 100 via the USB® communication, the authentication support unit 304 reads the device unique information containing the BT device address, PIN code, and BT profile of the mobile electronic device 104 from the nonvolatile memory 158, and transmits the read device unique information to the information providing apparatus 100.

The navigation function unit 308 is a virtual machine implemented when, for example, the processor 140 of the mobile electronic device 104, which is a smartphone, executes an application program. When a notification indicating that the USB® communication has been established is received from the authentication support unit 304, the navigation function unit 308 starts the USB® communication with the navigation support function unit 210 of the information providing apparatus 100, and starts processing for providing a navigation service using the display 112, the operation input unit 114, and the microphone 116 and/or the speaker 118 which are human interface devices of the information providing apparatus 100.

For example, the navigation function unit 308 acquires information indicating the latitude and longitude of a current location from the GPS unit 156 to identify the current location, and acquires map information of the area around the identified current location from a predetermined server (not shown) on the Internet via the wide-area wireless unit 154. Then the navigation function unit 308 transmits the acquired map information via the USB® communication to the information providing apparatus 100. Thus, the navigation support function unit 210 of the information providing apparatus 100 displays the received map information on the display 112. The navigation function unit 308 instructs the navigation support function unit 210 via the USB® communication to display operation buttons used for destination setting and for start of route search on the display 112.

In response to this, the driver, for example, touches the screen displayed on the display 112 of the information providing apparatus 100 to input a destination location, a destination setting instruction, and a route search instruction via the operation input unit 114. The navigation support function unit 210 transmits the input information to the navigation function unit 308 of the mobile electronic device 104. The navigation function unit 308 receives the information, performs the operation as instructed, and displays operation result information (e.g., the resulting route image) on the display 112 via the navigation support function unit 210.

The BT communication control unit 300 controls the operation of the BT controller 152. When the BT controller 152 receives an inquiry (IQ) packet from another BT device, the BT communication control unit 300 instructs the BT controller 152 to transmit, in accordance with a typical BT communication protocol, a frequency hop synchronization (FHS) packet containing a BT device address to the BT device that has transmitted the IQ packet. The BT communication control unit 300 refers to device unique information stored in the nonvolatile memory 158, extracts the BT device address from the device unique information, and gives the BT device address to the BT controller 152.

When a pairing request that designates the BT device address of the mobile electronic device 104 is received from another BT device, the BT communication control unit 300 instructs the BT controller 152 to perform pairing with the BT device in accordance with a typical BT communication protocol. When a PIN code transmission request is received from the BT device which is a communication counterpart, the BT communication control unit 300 refers to the device unique information stored in the nonvolatile memory 158, and transmits a PIN code contained in the device unique information to the BT device. When a link code is received from the BT device which is a communication counterpart, the BT communication control unit 300 stores the received link code. This enables encrypted communication with the BT device using the link code, and establishes BT communication.

When BT communication with another BT device is established, the BT communication control unit 300 notifies the phone function unit 306 that the BT communication has been established.

The phone function unit 306 is a virtual machine implemented when, for example, the processor 140 of the mobile electronic device 104, which is a smartphone, executes a built-in program installed in the mobile electronic device 104 in advance. The phone function unit 306 connects the mobile electronic device 104 to a public telephone line via the wide-area wireless unit 154 to implement a phone function. The BT communication control unit 300 exchanges information necessary for a hands-free call with the hands-free call function unit 212 of the information providing apparatus 100, via the established BT communication with the information providing apparatus 100.

When the mobile electronic device 104 is connected via the communication cable 102 to the vehicle-mounted information providing apparatus 100, the coordination system 10 having the above-described configuration first establishes USB® communication, which is first type communication, between the information providing apparatus 100 and the mobile electronic device 104. To establish BT communication, which is second type communication, with the mobile electronic device 104, the information providing apparatus 100 acquires device unique information from the mobile electronic device 104 via the established USB® communication. The device unique information is unique information necessary for individual identification of the mobile electronic device 104 and contains the BT device address and the PIN code. The information providing apparatus 100 establishes BT communication with the mobile electronic device 104 using the BT device address and the PIN code contained in the acquired device unique information.

Thus, in the coordination system 10, even when there are a plurality of BT devices, such as smartphones, in the vehicle or even when a plurality of BT devices are registered in the information providing apparatus 100, the information providing apparatus 100 can reliably perform pairing and establish BT communication with the mobile electronic device 104, which is a BT device, without requiring the driver to perform an input operation.

Therefore, the coordination system 10 can simplify a setting operation the driver needs to perform to establish communication between the vehicle-mounted information providing apparatus 100 and the mobile electronic device 104.

Next, an operation procedure of the coordination system 10 will be described. An operation of the coordination system 10 includes a device authentication process in the information providing apparatus 100 and an authentication support process in the mobile electronic device 104. These processes will now be described.

(Device Authentication Process)

A device authentication process in the information providing apparatus 100 will be described in accordance with the flowchart of FIG. 4. After the information providing apparatus 100 is powered on, the device authentication process starts when the USB® controller 120 detects that a USB® device has been connected via the connector 126 to the information providing apparatus 100. Upon detection of the USB® device, the USB® controller 120 notifies the USB® communication control unit 202 of the detection.

When the process starts, first, the USB® communication control unit 202 establishes USB® communication in accordance with a protocol defined by the USB® communication standard (step S101). At the same time, the USB® communication control unit 202 stores, in the storage unit 124, a device descriptor of the communication counterpart acquired in accordance with a typical USB® communication protocol. Also, the USB® communication control unit 202 transmits a notification indicating that USB® communication has been established to the device authentication unit 208.

Next, the USB® device authentication unit 204 of the device authentication unit 208 refers to the device descriptor of the USB® communication counterpart device stored in the storage unit 124, and determines whether the USB® communication counterpart device is the mobile electronic device 104 (step S102). If the USB® communication counterpart device is not the mobile electronic device 104 (NO in step S102), the information providing apparatus 100 performs error processing which involves, for example, displaying an error message on the display 112 (step S103) and ends the process. Instead of the error processing, the information providing apparatus 100 may execute a software program appropriate for the USB® communication counterpart device, which is not the mobile electronic device 104, to perform a predetermined operation. The software program may be stored in advance in a storage unit (e.g., the storage unit 124) of the information providing apparatus 100 depending on the device which will be connected to the connector 126.

On the other hand, if the USB® communication counterpart device is the mobile electronic device 104 (YES in step S102), the USB® device authentication unit 204 transmits a notification indicating that the USB® communication has been established to a predetermined functional unit that uses the USB® communication, the predetermined functional unit being the navigation support function unit 210 in the first embodiment (step S104). Upon receipt of the notification, the navigation support function unit 210 starts the USB® communication with the mobile electronic device 104. For example, in coordination with the navigation function unit 308 of the mobile electronic device 104, the navigation support function unit 210 can perform an operation, such as routing guidance, using human interface devices, such as the display 112 and the operation input unit 114.

In response to receipt of a device information request signal transmitted (in step S202 of FIG. 5) by the mobile electronic device 104 via the USB® communication (step S105), the USB® device authentication unit 204 reads device identification information of the information providing apparatus 100 stored in the storage unit 124 and transmits the read device identification information via the USB® communication to the mobile electronic device 104 (step S106). The operations in steps S105 and S106 may not be included in the device authentication process, and the operation in step S106 may be performed as a separate process executed, in response to the receipt of the device information request signal, in parallel with the device authentication process.

Next, the USB® device authentication unit 204 transmits a unique information request signal, which is a predetermined request signal, to the mobile electronic device 104 via the USB® communication (step S107). Then the USB® device authentication unit 204 receives device unique information transmitted (in step S208 of FIG. 5) by the mobile electronic device 104 in response to receipt of the unique information request signal (step S108). The USB® device authentication unit 204 transmits the received device unique information to the BT device authentication unit 206.

Next, the BT device authentication unit 206 starts processing for establishing BT communication with the mobile electronic device 104 by using the BT device address and the PIN code of the mobile electronic device 104 contained in the device unique information received from the USB® device authentication unit 204 (step S109).

Next, the BT device authentication unit 206 determines whether the BT communication has been established (step S110). If the BT communication has been established (YES in step S110), the BT device authentication unit 206 transmits a notification indicating that the BT communication has been established to a predetermined functional unit that uses the BT communication, the predetermined functional unit being the hands-free call function unit 212 in the first embodiment (step S111). The information providing apparatus 100 ends the process here. Thus, the hands-free call function unit 212 can start the BT communication with the phone function unit 306 of the mobile electronic device 104, and start processing for providing a hands-free call service.

On the other hand, if the BT communication has not been established (NO in step S110), the information providing apparatus 100 terminates the USB® communication (step S112), executes error processing which involves, for example, displaying an error message on the display 112 (step S113), and ends the process. Thus, for example, a communication connection with the mobile electronic device 104 having an abnormality in the BT communication function caused by a computer virus can be quickly terminated, so that the information providing apparatus 100 can be prevented from being infected by the virus. The determination as to whether the BT communication has been established in step S110 can be made by the notification transmitted from the BT communication control unit 200 to the BT device authentication unit 206, the notification indicating whether the BT communication has been successfully established.

(Authentication Support Process)

Figure 5:
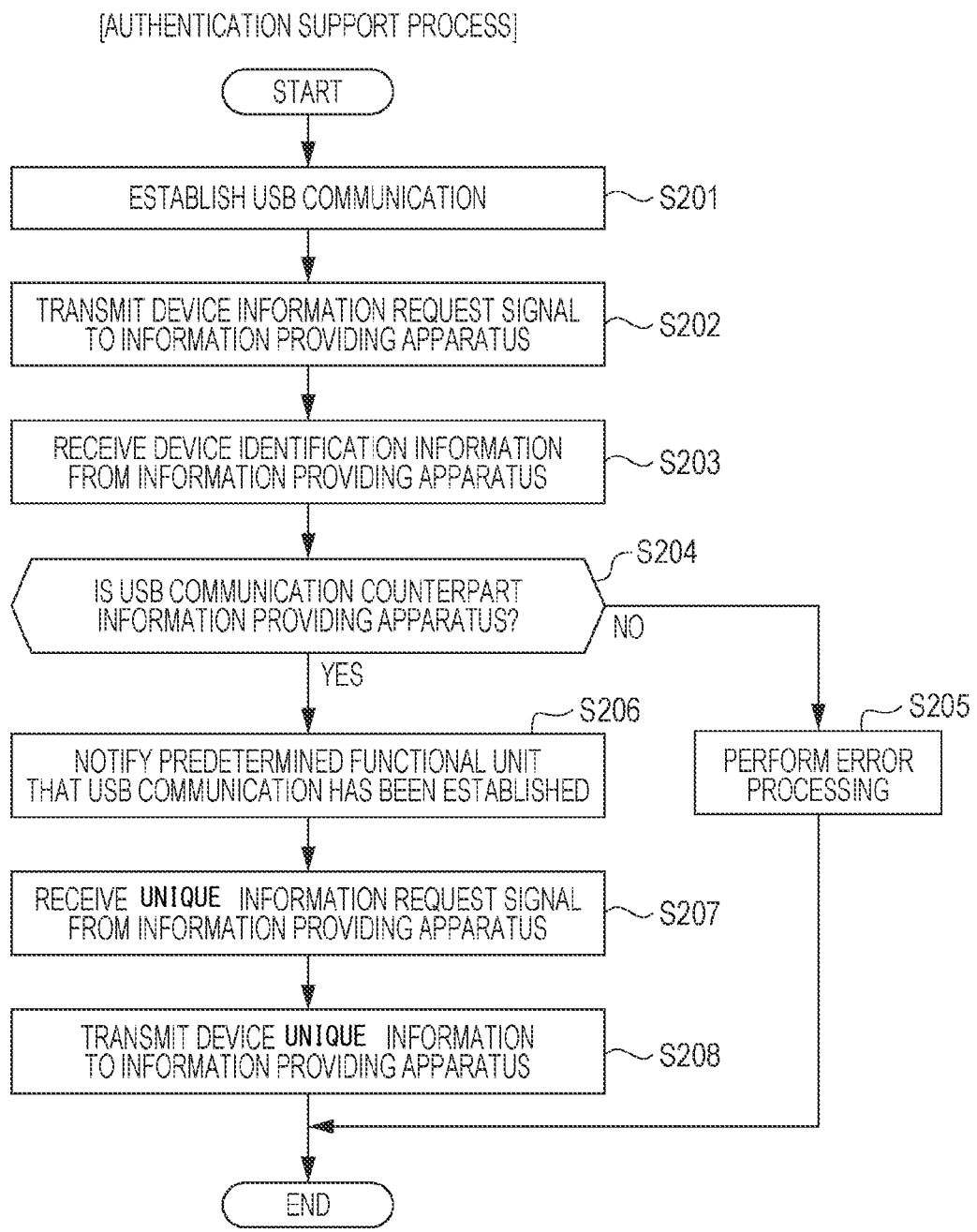
FIG. 5 is a flowchart illustrating an authentication support process in the mobile electronic device included in the coordination system according to the first embodiment.

Next, an authentication support process in the mobile electronic device 104 will be described in accordance with the flowchart of FIG. 5. After the mobile electronic device 104 is powered on, the authentication support process starts when the USB® controller 150 detects that a USB® device has been connected via the connector 160 to the mobile electronic device 104. Upon detection of a USB® device, the USB® controller 150 notifies the USB® communication control unit 302 of the detection.

When the process starts, the USB® communication control unit 302 establishes USB® communication in accordance with a protocol defined by the USB® communication standard (step S201). Then the USB® communication control unit 302 transmits a device information request signal to the information providing apparatus 100 via the established USB® communication (step S202). Next, the USB® communication control unit 302 receives device identification information transmitted (in step S106 of FIG. 4) by the information providing apparatus 100 in response to receipt of the device information request signal (step S203), and determines whether the USB® communication counterpart device is the information providing apparatus 100 on the basis of the received device identification information (step S204).

If the USB® communication counterpart device is not the information providing apparatus 100 (NO in step S204), the mobile electronic device 104 performs error processing which involves, for example, displaying an error message on the display 142 (step S205) and ends the process. Instead of the error processing, the mobile electronic device 104 may execute a software program appropriate for the USB® communication counterpart device, which is not the information providing apparatus 100, to perform a predetermined operation. The software program may be stored in advance in a storage unit (e.g., the nonvolatile memory 158) of the mobile electronic device 104 depending on the device which will be connected to the connector 160.

On the other hand, if the USB® communication counterpart device is the information providing apparatus 100 (YES in step S204), the USB® communication control unit 302 transmits a notification indicating that the USB® communication with the information providing apparatus 100 has been established to a predetermined functional unit that uses the USB® communication, the predetermined functional unit being the navigation function unit 308 in the first embodiment (step S206). Thus, the navigation function unit 308 starts the USB® communication with the navigation support function unit 210 of the information providing apparatus 100 and starts processing for navigation.

Next, the USB® communication control unit 302 receives a unique information request signal which is a predetermined request signal transmitted (in step S107 of FIG. 4) by the information providing apparatus 100 via the USB® communication (step S207). In response to the receipt of the unique information request signal, the USB® communication control unit 302 reads device unique information stored in the nonvolatile memory 158 and transmits the read device unique information to the information providing apparatus 100 (step S208). The process ends here.

The operations in steps S206 and S207 may not be included in the authentication support process, and the operation in step S207 may be performed as a separate process executed, in response to the receipt of the unique information request signal, in parallel with the authentication support process.

In the coordination system 10 according to the first embodiment, USB® communication is performed as first type communication and Bluetooth® communication is performed as second type communication. The configuration is not limited to this, and other types of communication may be performed.

For example, as second type communication, short-range wireless LAN communication compliant with the IEEE 802.11 standard (including communication using a Wi-Fi® certified device) may be performed. In this case, the information providing apparatus 100 acquires, via USB® communication, device unique information containing a media access control (MAC) address of the mobile electronic device 104 necessary for the wireless LAN communication, and establishes a connection of the wireless LAN communication on the basis of the acquired MAC address.

For example, as first type communication, short-range wireless LAN communication compliant with the IEEE 802.11 standard or high-definition multimedia interface (HDMI) (registered trademark) communication may be used. When the HDMI communication is used as first type communication, device unique information of the mobile electronic device 104 may be transmitted, along with a video signal and an audio signal transmitted via the HDMI communication, from the mobile electronic device 104 to the information providing apparatus 100.

Second Embodiment

A mobile electronic device coordination system (hereinafter referred to as a coordination system) according to a second embodiment will now be described.

In the coordination system 10 of the first embodiment described above, the information providing apparatus 100 automatically establishes BT communication with the mobile electronic device 104 on the basis of device unique information acquired from the mobile electronic device 104 via USB® communication. In the coordination system of the second embodiment, unlike in the coordination system 10 of the first embodiment, an information providing apparatus displays on the display 112 a list of all BT devices (e.g., mobile phones) having a phone function and present in the vehicle, before establishing BT communication, to ask the driver (user) to designate (select) a BT device with which to establish BT communication. In response to the driver's input of designation (selection) of a BT device, the information providing apparatus establishes BT communication with the BT device.

Thus, the information providing apparatus in the coordination system of the second embodiment can not only provide a service, such as a navigation function, in coordination with the mobile electronic device 104 connected thereto via a USB® cable, but can also provide a hands-free call function using a phone function of a BT device which is not the mobile electronic device 104.

In the coordination system of the second embodiment, after the information providing apparatus establishes USB® communication with the mobile electronic device 104 and also establishes BT communication with a different BT device, if the information providing apparatus newly establishes USB® communication with the mobile electronic device 104, the information providing apparatus establishes BT communication with the different BT device without requiring a driver's operation. Thus, for a driver who uses different mobile electronic devices depending on the function, such as a driver who uses the mobile electronic device 104 for navigation and uses another mobile electronic device for hands-free calls, the coordination system can improve driver's convenience by automatically establishing communication between the information providing apparatus and the mobile electronic device 104 and another mobile electronic device without requiring the driver's operation.

Figure 6:
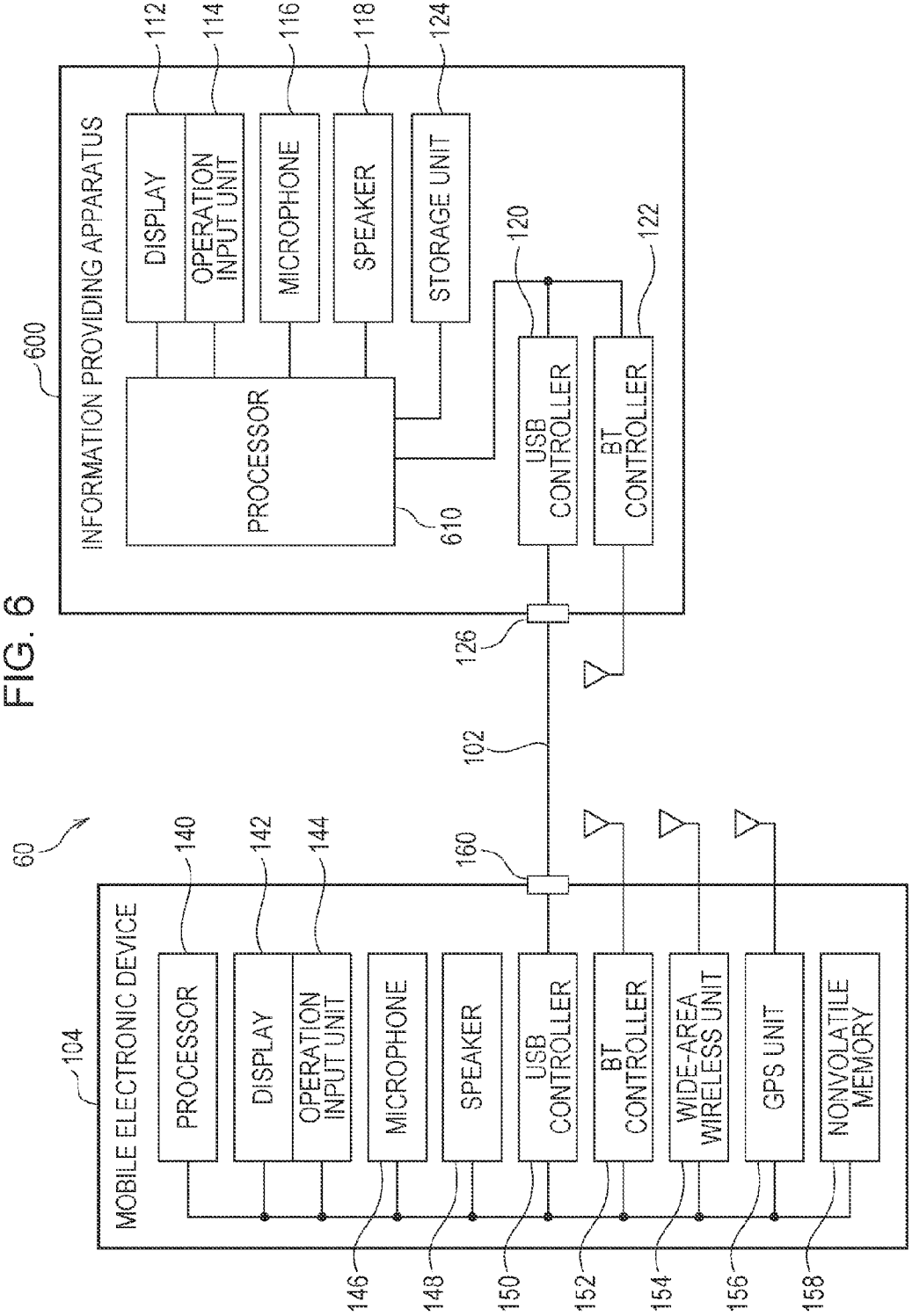
FIG. 6 illustrates a configuration of a mobile electronic device coordination system according to a second embodiment.

FIG. 6 illustrates a configuration of a mobile electronic device coordination system according to the second embodiment.

A coordination system 60 of the second embodiment includes an information providing apparatus 600 and the mobile electronic device 104 connected via the communication cable 102 to the information providing apparatus 600. In FIG. 6, the same components as those in FIG. 1 are indicated by the same reference numerals as those in FIG. 1, and the description for FIG. 1 is used for FIG. 6.

Figure 7:
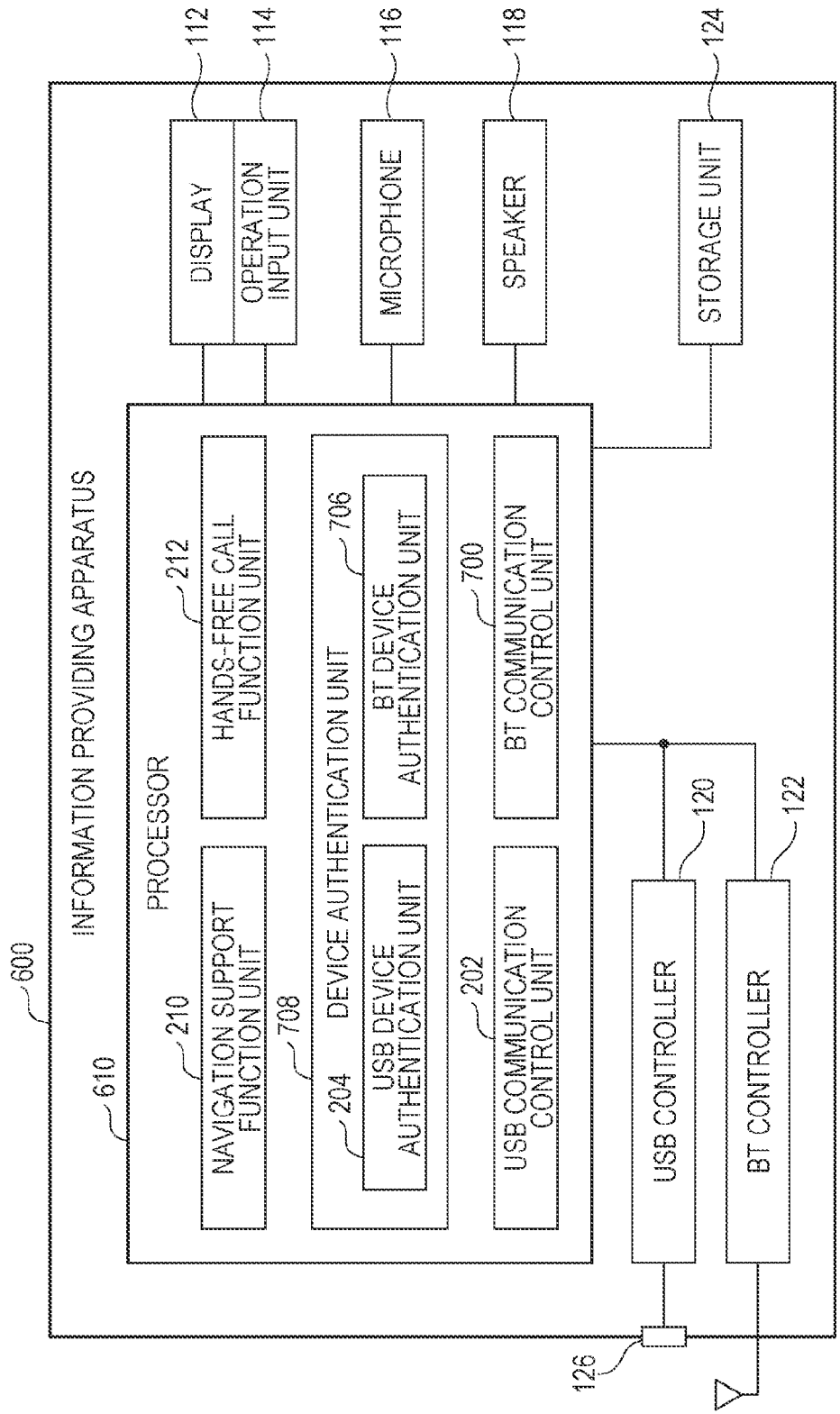
FIG. 7 illustrates a configuration of an information providing apparatus included in the coordination system according to the second embodiment.

FIG. 7 illustrates a configuration of the information providing apparatus 600 included in the coordination system 60. In FIG. 7, the same components as those in FIG. 2 are indicated by the same reference numerals as those in FIG. 2, and the description for FIG. 2 is used for FIG. 7.

The information providing apparatus 600 has the same configuration as that of the information providing apparatus 100 according to the first embodiment, except that the information providing apparatus 600 includes a processor 610 instead of the processor 110.

Like the processor 110, the processor 610 is a computer that includes a processing unit, such as a CPU, and a storage unit composed of a RAM and a ROM. The processor 610 has the same configuration as that of the processor 110, except that the processor 610 includes a BT communication control unit 700 and a device authentication unit 708 instead of the BT communication control unit 200 and the device authentication unit 208, respectively. The device authentication unit 708 has the same configuration as that of the device authentication unit 208, except that the device authentication unit 708 includes a BT device authentication unit 706 instead of the BT device authentication unit 206.

Each of the units, including the BT communication control unit 700, the BT device authentication unit 706, and the device authentication unit 708, of the processor 610 is a function implementing unit and is a virtual machine implemented when the processor 610, which is a computer, executes a program. In another embodiment, each of the units included in the processor 610 may be configured as a separate hardware component. The computer program can be stored in any computer-readable storage medium.

The BT device authentication unit 706 has the same functions as those of the BT device authentication unit 206. Additionally, the BT device authentication unit 706 instructs the BT communication control unit 700 to search for BT devices present around the information providing apparatus 600.

The BT communication control unit 700 has the same functions as those of the BT communication control unit 200. Additionally, when the search instruction is received from the BT device authentication unit 706, the BT communication control unit 700 causes the BT controller 122 to broadcast an IQ packet and waits for transmission of an FHS packet from each BT device that has received the IQ packet. Upon receipt of the FHS packet transmitted from each BT device, the BT communication control unit 700 performs pairing with the BT device on the basis of a BT device address contained in the FHS packet, and acquires a BT profile and a device name from the BT device. Then, the BT communication control unit 700 associates the BT device address, device name, and BT pro file of each BT device and transmits them to the BT device authentication unit 706.

The range where the BT communication control unit 700 searches for BT devices is limited within a cabin of the own vehicle by appropriately adjusting the transmission power and the reception sensitivity of the BT controller 122.

The BT device authentication unit 706 receives the BT profiles of BT devices present in the own vehicle from the BT communication control unit 700. On the basis of the received BT profiles, the BT device authentication unit 706 identifies BT devices having a phone function. Then, the BT device authentication unit 706 creates a BT device list that associates a device name and a BT device address of each identified BT device, and stores the BT device list in the storage unit 124. Since all BT devices present in the vehicle are found in the search operation described above, the BT device list includes the mobile electronic device 104 connected to the connector 126 of the information providing apparatus 600.

Then, the BT device authentication unit 706 refers to the BT device list stored in the storage unit 124, and creates a device name list that includes device names of the BT devices included in the BT device list. The BT device authentication unit 706 displays the created device name list and a message, such as "Select a device used for a hands-free call" on the display 112.

In response to this, the driver can input designation of a BT device used for a hands-free call, that is, designation of a communication counterpart with which to establish a communication connection via BT communication, which is second type communication. The driver can input the designation, for example, by touching a device name of a desired BT device included in the device name list displayed on the display 112 to input the device name via the operation input unit 114.

In response to the input of the device name of the BT device, the BT device authentication unit 706 transmits a BT device address corresponding to the input device name to the BT communication control unit 700, and instructs the BT communication control unit 700 to establish BT communication with the BT device having the BT device address. If the BT device corresponding to the input device name is the mobile electronic device 104, the BT device authentication unit 706 instructs the BT communication control unit 700 to establish BT communication with the mobile electronic device 104 by using a BT device address and a PIN code received from the USB® device authentication unit 204.

A determination as to whether the BT device corresponding to the input device name is the mobile electronic device 104 can be made by referring to a device descriptor acquired from the mobile electronic device 104 and stored in the storage unit 124 by the USB® communication control unit 202 in establishing USB® communication, and comparing the input device name with a device name contained in the device descriptor.

After establishing BT communication with the BT device having the BT device address received as described above, the BT communication control unit 700 that has been instructed to establish the BT communication transmits a notification indicating that the BT communication has been successfully established to the BT device authentication unit 706. In response to receipt of the notification, the BT device authentication unit 706 notifies the hands-free call function unit 212 that the BT communication has been established.

If the BT device corresponding to the input device name is not the mobile electronic device 104 currently connected to the connector 126, the BT device authentication unit 706 stores, in the storage unit 124, device associated information that associates the BT device address of the mobile electronic device 104 with the BT device address and the PIN code of the BT device corresponding to the input device name.

Thus, after the information providing apparatus 600 is started next time, when the USB® communication control unit 202 newly establishes USB® communication with the mobile electronic device 104 and receives the BT device address and the like of the mobile electronic device 104 from the USB® device authentication unit 204, the BT device authentication unit 706 refers to the device associated information stored in the storage unit 124, identifies a BT device associated with the mobile electronic device 104, and automatically establishes BT communication with the BT device.

A device authentication process in the information providing apparatus 600 of the second embodiment will be described in accordance with the flowchart of FIG. 8. After the information providing apparatus 600 is powered on, the device authentication process starts when the USB® controller 120 detects that a USB® device has been connected via the connector 126 to the information providing apparatus 600. Upon detection of the USB® device, the USB® controller 120 notifies the USB® communication control unit 202 of the detection.

Figure 4:
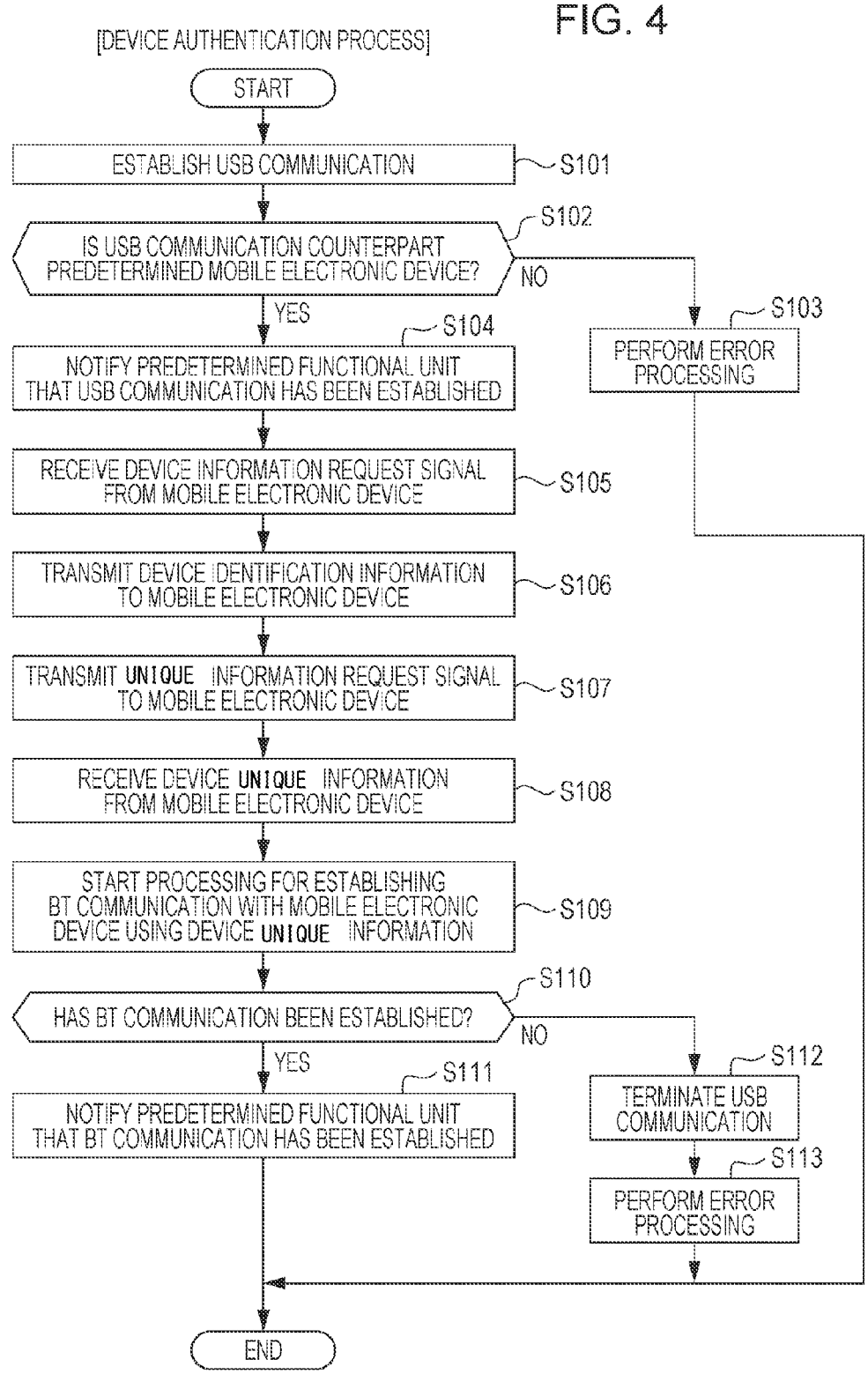
FIG. 4 is a flowchart illustrating a device authentication process in the information providing apparatus included in the coordination system according to the first embodiment.

In the flowchart of FIG. 8, the operations in steps S801 to S808 are the same as those in steps S101 to S108 illustrated in FIG. 4, and thus the description for FIG. 4 is used to describe the operations in steps S801 to S808. In the device authentication process in the information providing apparatus 600, after the operation in step S808, a BT device selection process is executed (step S809), which involves searching for BT devices present in the vehicle, driver's designation of one of the BT devices found by the search, and establishing BT communication with the designated BT device. Then the device authentication process ends.

FIG. 9 is a flowchart illustrating the BT device selection process in step S809.

Upon start of the BT device selection process, first, the BT device authentication unit 706 refers to the device associated information stored in the storage unit 124 to determine whether device associated information on the currently USB-connected mobile electronic device 104 (i.e., the mobile electronic device 104 currently connected such that it can communicate via the established USB® communication) is stored (step S901). This determination can be made, on the basis of a BT device address acquired from the USB-connected mobile electronic device 104, depending on whether there is device associated information on the BT device address.

If there is device associated information on the currently USB-connected mobile electronic device 104 (YES in step S901), the BT device authentication unit 706 uses a BT device address and a PIN code of a BT device associated with the mobile electronic device 104, indicated by the device associated information, to establish BT communication with the BT device (step S902). Next, the BT device authentication unit 706 transmits a notification indicating that the BT communication has been established to a predetermined functional unit that uses the BT communication, the predetermined functional unit being the hands-free call function unit 212 in the second embodiment (step S908). The process ends here.

On the other hand, if there is no device associated information on the currently USB-connected mobile electronic device 104 (NO in step S901), the BT device authentication unit 706 instructs the BT communication control unit 700 to search for BT devices present in the vehicle, and stores a BT device list in the storage unit 124 (step S903). The BT device list associates BT device addresses and device names of all BT devices having a phone function and found by the search.

Then, the BT device authentication unit 706 creates a list of device names of the BT devices included in the BT device list and displays the created list on the display 112 (step S904). From the displayed device names, the driver designates a device name of a BT device with which the driver wants to make a hands-free call. This designation can be input via the operation input unit 114 when the driver touches the device name of the BT device displayed on the display 112.

The BT device authentication unit 706 determines whether the designation of the BT device has been input (step S905). If the designation has not been input (NO in step S905), the process returns to step S905, where the BT device authentication unit 706 waits for input of the designation. On the other hand, if the designation of the BT device has been input (YES in step S905), the BT device authentication unit 706 determines whether the BT device designated by the input is the currently USB-connected mobile electronic device 104 (step S906). This determination can be made by identifying a BT device address corresponding to a device name of the designated BT device on the basis of the BT device list created in step S903, and determining whether the identified BT device address matches the BT device address acquired from the mobile electronic device 104 in step S808 of FIG. 8.

If the designated BT device is the currently USB-connected mobile electronic device 104 (YES in step S906), the BT device authentication unit 706 establishes BT communication with the mobile electronic device 104 by using the BT device address and the PIN code contained in the device unique information of the mobile electronic device 104 received in step S808 of FIG. 8 (step S907). Then the process proceeds to step S908.

On the other hand, if the designated BT device is not the currently USB-connected mobile electronic device 104 (NO in step S906), the BT device authentication unit 706 identifies a BT device address of the designated BT device from the BT device list and establishes BT communication with the designated BT device using the BT device address (step S909). A PIN code necessary to establish the BT communication can be acquired, for example, from the BT device after pairing therewith.

Next, the BT device authentication unit 706 generates device associated information that associates the currently USB-connected mobile electronic device 104 with the designated BT device, and stores the device associated information in the storage unit 124 (step S910). Then the process proceeds to step S908.

As described above, in the coordination system according to each of the first and second embodiments, the information providing apparatus and the mobile electronic device include respective communication units (USB® controllers 120 and 150) that perform first type communication (e.g., USB® communication) and respective communication units (BT controllers 122 and 152) that perform second type communication (e.g., Bluetooth® communication). The information providing apparatus acquires device unique information from the mobile electronic device, via a first communication unit that performs first type communication through which a communication connection with the mobile electronic device has been established. The device unique information is necessary for individual identification of the mobile electronic device for establishing a communication connection with the mobile electronic device for second type communication.

Thus, the coordination system can eliminate the need for a driver's input operation for at least one of communication connections via the two different types of communication, and simplify a setting operation the driver needs to perform for establishing communication between the mobile electronic device and the vehicle-mounted information providing apparatus. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A mobile electronic device coordination apparatus comprising a vehicle-mounted information providing apparatus configured to provide information to a vehicle's driver and a mobile electronic device, the mobile electronic device coordination apparatus being configured to enable use of functions of the mobile electronic device via the information providing apparatus, wherein the information providing apparatus and the mobile electronic device are each configured to perform both first type communication and second type communication different from the first type communication, wherein the mobile electronic device includes a first function available through the first type communication by the information providing apparatus, and a second function available through the second type communication by the information providing apparatus, and wherein the information providing apparatus is configured to establish a first communication connection for the first type communication with the mobile electronic device, acquire unique information from the mobile electronic device via the established first type communication, the unique information being necessary for individual identification of the mobile electronic device for establishing a second communication connection for the second type communication with the mobile electronic device; and establish the second communication connection for the second type communication with the mobile electronic device by using the acquired unique information, wherein both of the first function and the second function are available after the second communication connection has been established, and wherein if the information providing apparatus fails to establish the second communication connection with the mobile electronic device by using the acquired unique information, the information providing apparatus terminates the first communication connection.

2. The mobile electronic device coordination apparatus according to claim 1, wherein in response to a designation input with respect to a communication counterpart to be connected with by using the second type communication, the information providing apparatus establishes the second communication connection with the mobile electronic device corresponding to the acquired unique information or with a different device that performs the second type communication.

3. The mobile electronic device coordination apparatus according to claim 2, wherein after the information providing apparatus established the first communication connection with the mobile electronic device and established the second communication connection with the different device in response to the designation input, when the information providing apparatus newly establishes the first communication connection for the first type communication with the mobile electronic device, the information providing apparatus establishes the second communication connection for the second type communication with the different device without requiring the designation input.

4. The mobile electronic device coordination apparatus according to claim 1, wherein the information providing apparatus implements a hands-free call function by performing the second type communication with the mobile electronic device.

5. The mobile electronic device coordination apparatus according to claim 1, wherein the information providing apparatus searches a second mobile electronic device other than the mobile electronic device connected by the first type communication, and makes a list including both of the mobile electronic devices to prompt a designation input with respect to a communication counterpart to be connected with by using the second type communication, and wherein in response to the designation input, the information providing apparatus establishes the second communication connection with one of the mobile electronic devices.

6. The mobile electronic device coordination apparatus according to claim 5, wherein if the second mobile electronic device is designated by the designation input, the information providing apparatus generates and stores a device associated information associating the second mobile electronic device with the mobile electronic device connected by the first type communication.

7. The mobile electronic device coordination apparatus according to claim 6, wherein when the first communication connection has been established, the information providing apparatus determines if there exists the device associated information corresponding to the mobile electronic device currently connected by the first communication connection, and if so, the information providing apparatus automatically establishes the second communication connection with the associated second mobile electronic device.

8. A vehicle-mounted information providing apparatus that enables use of functions of a mobile electronic device by communicating with the mobile electronic device, the information providing apparatus comprising:

a first communication unit configured to perform first type communication;

a second communication unit configured to perform second type communication different from the first type communication; and a processor configured to control communication performed by the first communication unit and the second communication unit such that the first communication unit establishes a first communication connection for the first type communication with the mobile electronic device;

the first communication unit acquires unique information from the mobile electronic device, the unique information being necessary for individual identification of the mobile electronic device for establishing a second communication connection for the second type communication with the mobile electronic device; and the second communication unit establishes the second communication connection for the second type communication with the mobile electronic device by using the acquired unique information, wherein the mobile electronic device includes a first function available through the first type communication by the information providing apparatus, and a second function available through the second type communication by the information providing apparatus, wherein both of the first function and the second function are available after second communication connection has been established, and wherein if the information providing apparatus fails to establish the second communication connection with the mobile electronic device by using the acquired unique information, the information providing apparatus terminates the first communication connection.

9. A method for communicating a vehicle-mounted information providing apparatus with a mobile electronic device comprising steps of:

establishing, by using a computer, a first communication connection for a first type communication with the mobile electronic device;

acquiring, by using a computer, unique information from the mobile electronic device, the unique information being necessary for individual identification of the mobile electronic device for establishing a second communication connection for a second type communication with the mobile electronic device; and establishing, by using a computer, the second communication connection for the second type communication with the mobile electronic device by using the acquired unique information, wherein the mobile electronic device includes a first function available through the first type communication by the information providing apparatus, and a second function available through the second type communication by the information providing apparatus, wherein both of the first function and the second function are available after second communication connection has been established, and wherein if the step of establishing the second communication connection with the mobile electronic device by using the acquired unique information fails, terminating the first communication connection.

10. A non-transitory computer readable medium storing a program that causes a vehicle-mounted computer perform steps of:

establishing a first communication connection for a first type communication with the mobile electronic device;

acquiring unique information from the mobile electronic device, the unique information being necessary for individual identification of the mobile electronic device for establishing a second communication connection for a second type communication with the mobile electronic device; and establishing the second communication connection for the second type communication with the mobile electronic device by using the acquired unique information, wherein the mobile electronic device includes a first function available through the first type communication by the vehicle-mounted computer, and a second function available through the second type communication by the vehicle-mounted computer, wherein both of the first function and the second function are available after second communication connection has been established, and wherein if the step of establishing the second communication connection with the mobile electronic device by using the acquired unique information fails, terminating the first communication connection.

* * * * *